United States Patent
Richardson et al.

(10) Patent No.: US 6,377,739 B1
(45) Date of Patent: Apr. 23, 2002

(54) TWO DIMENSIONAL FIBER OPTIC OUTPUT ARRAY

(75) Inventors: Douglas Richardson, Port Moody; Amos Michelson, Vancouver, both of (CA)

(73) Assignee: Creo SRL, Burnaby (CA)

( * ) Notice: Subject to any disclaimer, the term of this patent is extended or adjusted under 35 U.S.C. 154(b) by 0 days.

(21) Appl. No.: 09/272,743

(22) Filed: Mar. 9, 1999

(51) Int. Cl.[7] .............................. G02B 6/04; G02B 6/06
(52) U.S. Cl. ...................................... 385/115; 385/116
(58) Field of Search ............................ 385/115, 116, 385/133

(56) References Cited

U.S. PATENT DOCUMENTS

| | | | |
|---|---|---|---|
| 3,653,738 A | * | 4/1972 | Gloge ........................ 385/133 |
| 4,590,492 A | | 5/1986 | Meier ......................... 346/107 |
| 4,743,091 A | | 5/1988 | Gelbart |
| 4,875,969 A | | 10/1989 | Hsu et al. .................... 156/633 |
| 4,923,275 A | | 5/1990 | Kankeinen |

* cited by examiner

Primary Examiner—Frank G. Font
Assistant Examiner—Amanda Merlino
(74) Attorney, Agent, or Firm—Oyen Wiggs Green & Mutala

(57) ABSTRACT

A plurality of fiber optic cables are bundled into a two dimensional output array which "writes" multiple data tracks onto a recording surface during a single pass of the array. The geometry of the array provides that the data tracks may be spaced at fine intervals when written onto the recording surface without requiring that the fibers of the output array have a correspondingly fine separation. The reduction in the pitch of the written tracks is achieved by staggering multiple rows of equally spaced optical fibers. To build a two dimensional array having relatively equal spacing of fibers, a spacing fixture is used, or, alternatively, the diameter and shape of the fiber cladding itself can be used.

23 Claims, 3 Drawing Sheets

TWO DIMENSIONAL FIBER OPTIC OUTPUT ARRAY

FIELD OF THE INVENTION

The present invention relates to a fiber optic output array and, more particularly, to a two dimensional fiber optic output array adapted to produce high resolution images on a recording surface.

BACKGROUND OF THE INVENTION

Laser recording systems employing fiber optics to guide light are well known in the art. Output arrays featuring multiple optical sources are frequently used to decrease the total time required to record data. In such systems, the output arrays are normally "scanned" in a linear manner relative to a recording surface and the light from each of the optical sources, modulated with input data, records the data onto a "track" during the scanning pass. In this manner, a single pass of the array writes data onto multiple parallel tracks, thereby reducing the total recording time. The parallel data tracks are often referred to in the art as "raster lines". In this application, the two terms, "track" and "raster line" are used interchangeably.

With all multi-source output systems, there exists a common hurdle which must be overcome. The physical dimensions of the optical sources can limit the resolution that the system is capable of achieving on the recording surface. The resolution of the raster lines on the recording medium is known as the effective "raster spacing" or "track spacing".

A first technique to reduce the dimensions of the arrays of the optical sources is to use fiber optic cables, which can receive light from the sources and bend it so as to bring the light from individual sources into closer proximity. Many other schemes are presently used to reduce the raster spacing for fiber optic output sources. A common method involves a one dimensional array containing a plurality of fiber optic output sources which are aligned at an angle with respect to the scan direction. This geometry reduces the effective track spacing on the recording surface. Several systems employing this scheme are covered in U.S. Pat. Nos. 4,875,969, 4,923,275, and 5,321,426.

The '969 patent discloses a linear array of fiber optic output sources which are mounted on a substrate configured with grooves to receive the fiber ends and to precisely space the fibers relative to one another. In addition, to further reduce the spacing of the fiber ends, the cladding of the fiber is etched to decrease its diameter. The '275 patent discloses a similar apparatus, where the substrate is elongated and includes grooves which narrow in spacing towards the output end, so that upon receiving the fibers, the spacing of the output ends can be narrowed uniformly. Finally, the '426 patent discloses the use of the '275 apparatus in a printer head.

As previously mentioned, the common component of the three aforementioned patents is the linear array of fiber optic output sources. The array is oriented at an angle with respect to the scan direction so as to reduce the effective track spacing on the recording medium. This design is depicted in FIG. 1. The array of fiber optic output sources 10 is aligned at an angle $\theta$ with respect to the scan direction 12. As a result of this geometry, the images on individual sources 11 are written onto the recording medium such that the effective track spacing a is given by $a = d \sin \theta$, where d is the actual center to center spacing of the fiber ends. A major drawback associated with the linear array implementation is the limitation imposed by constraints on the field of view of the imaging optics. In order to image an N element array, the field of view of the imaging optics must be at least Nd. The imaging optics, which are located between the tips of the optical fibers and the recording material follow prior art practices such as multi-element lenses with or without autofocus mechanisms. The field of view limitation comes from the imaging option. Therefore, there is a tradeoff between the field of view of the imaging optics and the number of fibers in the array. An associated drawback is the extra step required to etch the cladding from the fibers in the array. The reduction in cladding diameter is helpful to reduce the center to center spacing of the fibers d, which in turn decreases the raster line spacing a and the required field of view Nd of the imaging optics. However, the number of array elements N remains constrained by the required field of view Nd.

U.S. Pat. No. 4,743,091 describes a two dimensional array of optical sources, which substantially reduces the constraint caused by the field of view of the imaging optics. Essentially, the '091 apparatus is a two dimensional array comprising a combination of one dimensional arrays (similar to those of FIG. 1), that are offset with respect to the adjacent arrays. In this manner, the columns of the array are oriented at an angle with respect to the scanning direction such that a reduction in the effective track spacing is achieved. Having a two dimensional array rather than a one dimensional array effectively reduces the required field of view to approximately $\sqrt{(2N)}d$, for the same number N of output sources with a center to center spacing d. The drawback with the '091 patent is that it is only discloses the use of diodes as optical sources. It does not take advantage of fiber optic technology, which, as mentioned, can bend the light and reduce the center to center spacing of the output elements d.

Finally, U.S. Pat. No. 4,590,492 describes a two dimensional array of fiber optic output sources. The array includes a mask having apertures photolithographically attached to the output ends of the fibers such that there is one aperture positioned over each fiber. The drawback with this arrangement is that a great deal of light energy is lost because of the mask and the system efficiency is substantially reduced. The '492 invention fails to take advantage of the range of variation in cladding and core diameters of fiber optic lines that are available today.

Accordingly, it is an object of this invention to provide for a two dimensional output array of fiber optic cables which is capable of producing high density raster lines of data on a recording medium.

It is another object of this invention to produce such high density raster lines without being overly constrained by the field of view requirements posed by the imaging optics.

It is a further object of this invention to produce such an output array which maintains maximum light transfer and does not unnecessarily impede light carrying output data from the array. Accordingly, such an apparatus would improve the overall system data recording efficiency.

SUMMARY OF THE INVENTION

In accordance with the present invention, a two dimensional fiber optic output array is provided which has a plurality of fibers operative to optically emit modulated data at a high optical efficiency. The array comprises a plurality of columns of fibers and a plurality of rows of fibers.

To reduce the effective track spacing on the recording surface, each one of the rows is offset, in a direction of the rows, relative to the adjacent rows. In this manner, the columns are "tilted" slightly and are oriented at a non-perpendicular angle with respect to the rows.

Each of the fibers in the array has a complete core and cladding and there is no unnecessary attenuation of the output light which would tend to reduce the optical efficiency of the apparatus.

Advantageously, the center to center separation of the fibers in the array may be at least twice the diameter of the fiber core.

In one embodiment of the invention, a spacing element may be used to maintain precise control over the position of the fibers within the rows and columns.

In a second embodiment of the invention, an outside surface of the fiber cladding may be used to maintain precise control over the position of the fibers within the rows and columns. Preferably, with this embodiment, each one of the columns may be offset, in a direction of the columns, relative to the adjacent columns.

Advantageously, the apparatus may use multi-mode fibers or single-mode fibers.

DESCRIPTION OF THE PREFERRED EMBODIMENT

Figure 1:
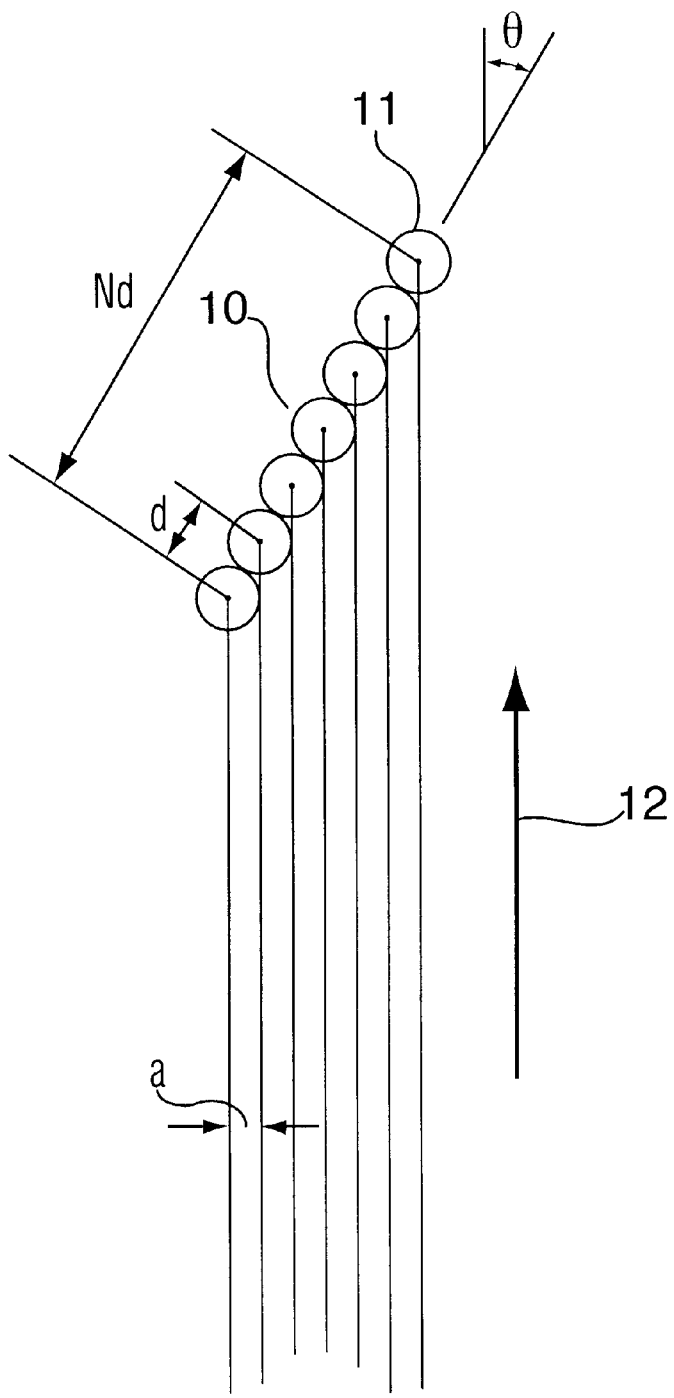
FIG. 1 is a picture of the prior art technique using a linear array of optical output fibers to reduce the effective track spacing on the recording medium.
Figures 2, 3:
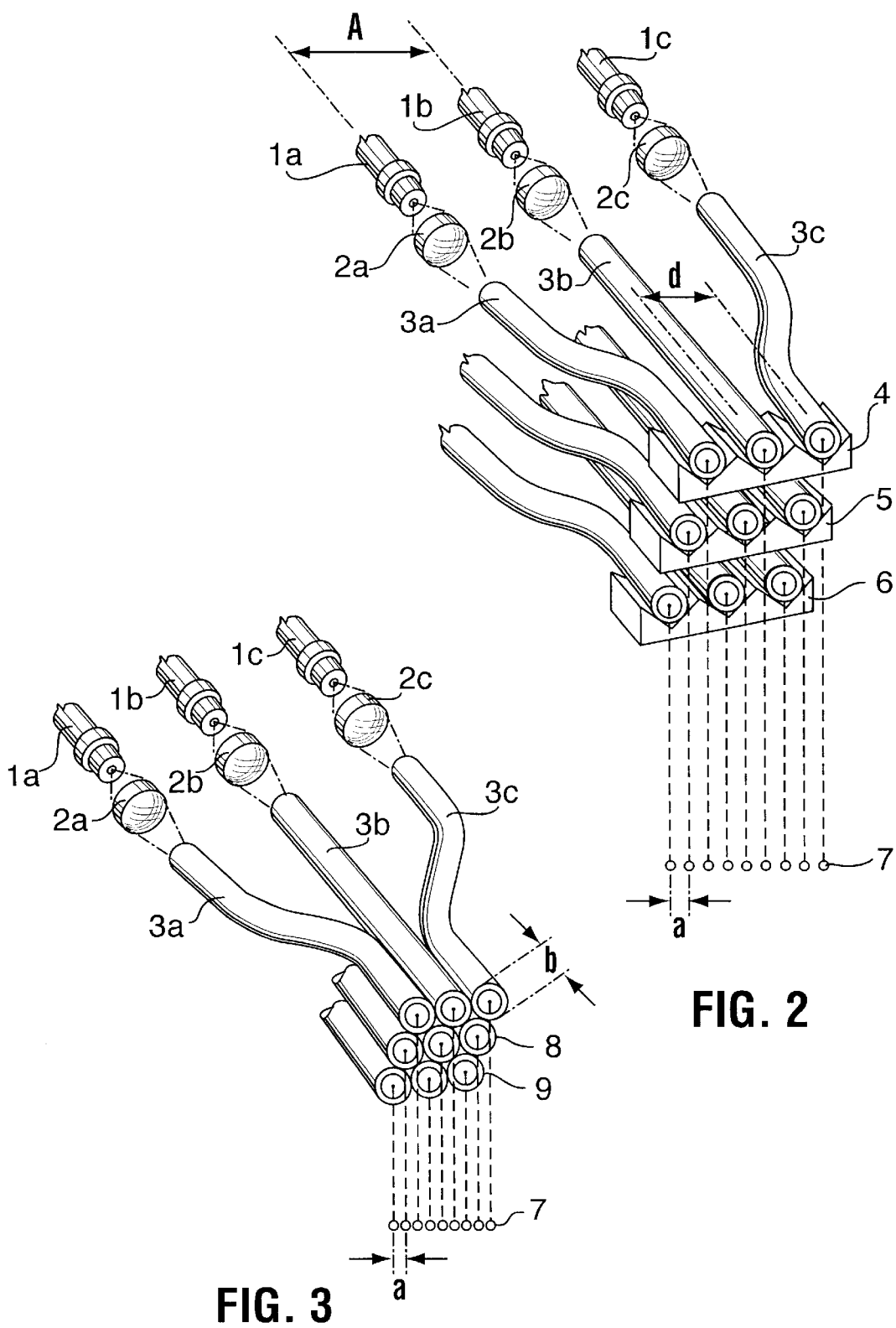
FIG. 2 is a depiction of the present invention showing how a two dimensional fiber optic array can be created with a spacing fixture to maintain the relative distance between the individual fiber ends.
FIG. 3 depicts how the round shape and the cladding diameter of the individual fibers can be used to maintain the relative distance between the individual fiber ends.

Referring to FIG. 2, an embodiment of the present invention is depicted. FIG. 2 shows a two dimensional array of nine fiber optic cables. Data which modulates the output from a diode 1a, 1b, 1c is connected by coupling optics 2a, 2b, 2c to the fibers 3a, 3b, 3c. Only three fibers are enumerated for simplicity of drawing and discussion. The advantage of using fiber optics becomes clear when the diode separation A is reduced by bending the fibers such that the center to center separation at the output end of the fibers d is much less than the diode separation A.

The output ends of the fibers are inserted into spacing fixtures 4, 5 and 6. The two dimensional array of fibers at the output is constructed of a number of rows. The spacing fixtures 4, 5, and 6 maintain the precise separation of the fibers d within a row. As is evident in the diagram, each row of fibers is offset slightly from the adjacent row, creating array columns which are "tilted" and non-perpendicular to the rows. In general, the number of rows of fibers should be equivalent to the number of fibers in each row. That is, if there are N fibers in total, then there should be $\sqrt{N}$ fibers in each row and $\sqrt{N}$ rows in the array. With such an arrangement, each row is offset by a distance $$\frac{d}{\sqrt{N}}$$

relative to the adjacent row, such that the effective track spacing a is reduced to $$a = \frac{d}{\sqrt{N}}.$$

Theoretically, there is no upper limit on the separation between adjacent rows, but the dimensions of the fibers and the spacing fixtures present a lower bound.

Ideally, the core to cladding ratio of the fiber, the fiber separation d and the total number of fibers N should be selected such that there complete coverage of the image receiving surface and a minimum of interference between the data recorded in adjacent tracks. This "guideline" can easily be achieved if the fiber core diameter is selected to be at least equal to, but not significantly greater than the raster line spacing $$a = \frac{d}{\sqrt{N}}.$$

No mask or other light attenuating device is required to prevent interaction between the data recorded on adjacent tracks of the image receiving surface. It is clear that the part disclosed here is the essence of the invention. No external optics, used to image the fiber tips onto the recording material are shown, as these are well known.

FIG. 3 depicts an alternate embodiment of the invention wherein the shape of the fibers 3a, 3b and 3c and the cladding diameter are employed to maintain the precise separation between the fiber ends. A fiber from one row 8 in the array rests between two fibers from an adjacent row 9, but the entire array is skewed slightly such that alternating rows of fibers record at regular intervals. This skewing of the array is equivalent to introducing an offset to the columns of the array or in effect "tilting" the rows. The skewing of the array is depicted clearly in FIG. 3. If the cladding diameter of the fibers (not shown) is represented by b and the total number of fibers in the two dimensional array is N, then the raster spacing on the image receiving surface is approximately $$a = \frac{b}{\sqrt{N}}.$$

Other than structurally, this embodiment is fundamentally different than the first embodiment because the raster spacing a is dependent on the cladding diameter b, rather than the spacing variable d. Once again, there is a guideline on the total number of fibers in the array N, the cladding diameter b and the core diameter such that the entire image receiving surface is covered and there is a minimum overlap between adjacent tracks. This guideline is satisfied if the core diameter of the fibers is at least equivalent to, but not significantly greater than the raster line separation $$\frac{b}{\sqrt{N}}.$$

Figure 4:
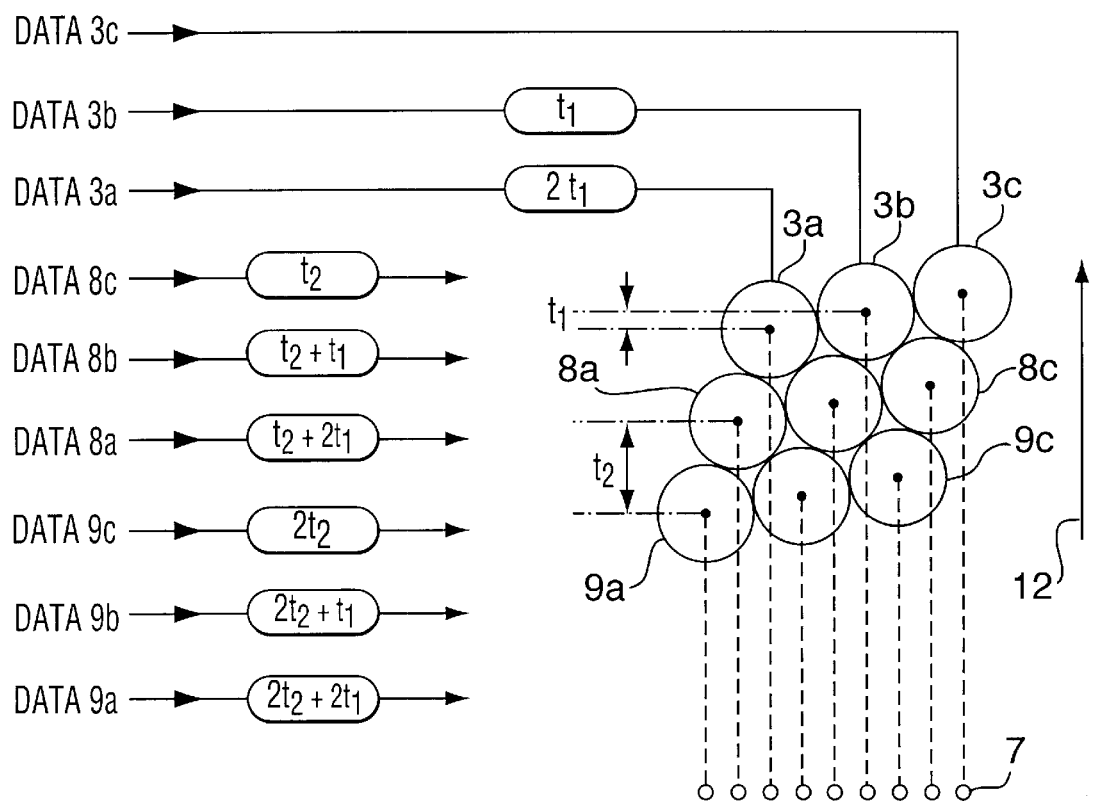
FIG. 4 depicts the delay architecture required for a printing system which employs the present invention.

FIG. 4 depicts a system architecture for the second embodiment of the invention. The array in the figure is a three by three array of fibers where N=9. In order to have spots 7 be recorded in a straight line on the recording medium (not shown), delays have to be introduced into the data lines DATA3(a,b,c), DATA8(a,b,c), and DATA9(a,b,c). Supposing the array is scanning in direction 12, fiber 3c will reach its spot $7_{3c}$ prior to the others; consequently, fiber 3c is not delayed. Because of the skew in the array, fiber 3b is slightly behind fiber 3c and a delay $t_1$ is introduced to compensate for the delay. The exact delay $t_1$ is a function of the scan rate and the distance by which the array has been skewed. Similar to fiber 3b, fiber 3a has a delay of $2t_1$. A second delay $t_2$ is introduced for fiber 8c when the second row of the array is reached. The actual delay $t_2$ is a function of the scan rate and the separation of the rows of the array. The delays of the remaining diodes are linear combinations of the delays $t_1$ and $t_2$. They are depicted in FIG. 4.

The invention has been described with reference to two particular embodiments, but it is understood that there may be slight variations to the embodiments, which are within the scope of the invention.

What is claimed is:

1. A two dimensional fiber optic output array having a plurality of fibers operative to optically emit modulated data at a high optical efficiency, said array comprising:
    a plurality of columns, each column having therein a plurality of fibers; and
    a plurality of rows, each row having therein a plurality of fibers,
    each one of said rows being offset, in a direction of the rows, relative to an adjacent row, by an amount less than the spacing of the columns,
    each one of said fibers having a core and a cladding;
    wherein the center to center separation of said fibers is at least twice the diameter of the core of said fibers.

2. An apparatus according to claim 1, wherein a spacing element is used to maintain precise control over the position of said fibers within said rows and columns.

3. An apparatus according to claim 1, wherein an outside surface of the cladding of said fibers is used to maintain precise control over the position of said fibers within said rows and columns.

4. An apparatus according to claim 3, wherein each one of said columns is offset, in a direction of the columns, relative to an adjacent column.

5. An apparatus according to claim 1, wherein said fibers are multi-mode fibers.

6. An apparatus according to claim 1, wherein said fibers are single-mode fibers.

7. A two-dimensional fiber optic output array comprising a plurality of fibers each comprising a core, a cladding, an input end and an output end, each fiber operative to carry a modulated optical signal from the input end and to emit the signal at the output end,
    the output ends of the fibers arranged in an array comprising a plurality of spaced apart columns each of the columns comprising a plurality of fibers, and a plurality of rows, each row comprising a plurality of fibers,
    each one of said rows being offset, in a direction of the rows, relative to an adjacent row, by an amount less than a spacing of the columns.

8. The two-dimensional fiber optic output array of claim 7, wherein, for a plurality of pairs of the fibers, a center-to-center separation of the output ends of the fibers in the pair is less than, a center-to-center separation of the input ends of he fibers in the pair.

9. The two-dimensional fiber optic output array of claim 7, wherein, a plurality of the fibers are bent so that, for each fiber, center-to-center separations between the output end of the fiber and the output ends of adjacent fibers in the array are less than center-to-center separations between the input end of the fiber and the input ends of the adjacent fibers.

10. The two-dimensional fiber optic output array of claim 7, comprising a spacing element located between an adjacent pair of the rows, the spacing element comprising a member bearing a plurality of equally-spaced apart grooves with the fibers of one of the rows located in the grooves.

11. The two-dimensional fiber optic output array of claim 7, wherein each fiber has a round cross section, at least in a portion near its output end, and the output ends of the fibers are packed together in a close-packed array.

12. The two-dimensional fiber optic output array of claim 7, wherein each one of said columns is offset, in a direction of the columns, relative to an adjacent column.

13. The two-dimensional fiber optic output array of claim 7, wherein said fibers comprise multi-mode fibers.

14. The two-dimensional fiber optic output array of claim 7, wherein said fibers comprise single-mode fibers.

15. The two-dimensional fiber optic output array of claim 7, comprising a laser diode optically coupled to the input end of each of the fibers.

16. The two-dimensional fiber optic output array of claim 15, comprising a spacing element located between each adjacent pair of rows, each spacing element comprising a side bearing a plurality of equally-spaced apart grooves with the fibers of one of the rows located in the grooves.

17. The two-dimensional fiber optic output array of claim 15, therein each fiber has a round cross section, at least in a portion near its output end, and the output ends of the fibers are packed together in a close-packed array.

18. The two-dimensional fiber optic output array of claim 7, wherein each one of said columns is offset, in a direction of the columns, relative to an adjacent column.

19. A fiber optic output array comprising plurality of spaced apart light sources each emitting a modulated optical beam;
    a plurality of optical fibers, each of the plurality of fibers comprising a core and a cladding and having an input end optically coupled to the beam from a corresponding one of the light sources;
    the optical fibers having output ends arranged in an array comprising a plurality of spaced apart columns, each column having therein a plurality of fibers, and a plurality of rows, each row having therein a plurality of fibers,
    each one of the rows being offset, in a direction of the rows, relative to an adjacent row, by an amount less than a spacing of the columns.

20. The fiber optic output array of claim 19, wherein a center to center separation of the fibers is at least twice a diameter of the cores of said fibers.

21. The fiber optic output array of claim 19, comprising a spacing element located between adjacent rows of the array.

22. The fiber optic output array of claim 19, wherein an output end portion of each of the fibers is touching a corresponding output end portion of at least two adjacent fibers.

23. The fiber optic output array of claim 22, wherein each one of said columns is offset, in a direction of the columns, relative to an adjacent column.

* * * * *